United States Patent [19]
Krekeler et al.

[11] 3,943,019
[45] Mar. 9, 1976

[54] OPTICAL FILTER

[75] Inventors: Ulrich Krekeler, Osterwangen; Peter Schneller, Munich, both of Germany

[73] Assignee: AGFA-Gevaert Aktiengesellschaft, Leverkusen, Germany

[22] Filed: May 16, 1974

[21] Appl. No.: 470,563

Related U.S. Application Data

[62] Division of Ser. No. 290,548, Sept. 20, 1972, abandoned.

[30] Foreign Application Priority Data

Sept. 22, 1971 Germany............................ 2147261

[52] U.S. Cl.................... 156/99; 96/84 R; 96/111; 156/242; 260/117; 350/314; 427/162
[51] Int. Cl.²..................... B29D 27/00; C09H 7/00
[58] Field of Search...... 156/99, 110 MD, 231, 232, 156/242–246; 260/117, 118; 350/314, 316; 117/33.3; 264/1, 82, DIG. 37, 38, 42; 96/84, 111; 427/162

[56] References Cited
UNITED STATES PATENTS

| | | | |
|---|---|---|---|
| 2,450,746 | 10/1948 | Bliss...................................... | 117/33.3 |
| 2,801,188 | 7/1957 | Minsk................................... | 117/33.3 |
| 2,916,968 | 12/1959 | Jackson................................ | 350/314 |
| 3,205,767 | 9/1965 | Weber et al......................... | 350/314 |
| 3,236,290 | 2/1966 | Lueder................................. | 350/314 |
| 3,237,513 | 3/1966 | Dreyfoos et al..................... | 350/314 |
| 3,354,025 | 11/1967 | Aykanian et al.................... | 350/314 |
| 3,600,482 | 8/1971 | Salger et al.......................... | 260/117 |
| 3,746,429 | 7/1973 | Spindel et al....................... | 350/314 |
| 3,819,608 | 6/1974 | Yamamoto et al.................. | 260/117 |

*Primary Examiner*—Douglas J. Drummond
*Assistant Examiner*—John E. Kittle
*Attorney, Agent, or Firm*—Connolly and Hutz

[57] ABSTRACT

Optical wedge filter comprising a coloured gelatine layer on a flexible transparent support and a flexible transparent covering foil bonded the gelatine layer wherein the thickness of the coloured gelatine layer increases stepwise or continuously.

2 Claims, 1 Drawing Figure

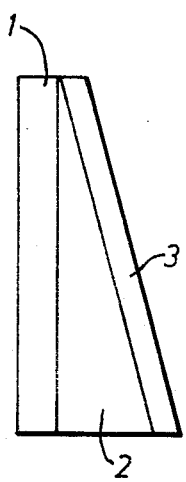

OPTICAL FILTER

This application is a division of copending application Ser. No. 290,548, filed Sept. 20, 1972, entitled "Optical Filter" now abandoned.

Optical filter discs of coloured gelatine, with either constant density or areas of differing density, such as stepped filters or filters with continuously variable density, have been known for a long time.

Stepped filters or filters with continuously variable density are used in exposure-regulating devices for photographic cameras. For example, in a camera where the light is measured through the lens, the stepped filter is swung into position to lie at a variable distance in front of the light measuring element of the exposure control, depending on the sensitivity of the photographic material.

A further use for such filters is in the adjustment of the aperture values in cameras used for narrow-gauge films. The filters preferably used for this purpose are those with continuously variable density. In these narrow-gauge film cameras, the iris-diaphragm can only be constricted to a limited extent before diffraction phenomena occur. Further reduction in the light entering the camera is then achieved by swinging a continuously variable density filter in front of the aperture to the appropriate depth after the aperture has been adjusted to its smallest value.

Stepped filters, filters with continuously variable density and maximum filters of coloured gelatine are used for colouring the copying light used for automatic photographic printers.

In the conventional processes for the production of the filters, the gelatine solution is coloured appropriately and hardener is added; the amount of hardener which can be added is limited because the casting solution must remain workable for a sufficient length of time for the production of the filter and the dye must not be subjected to any change (discolouration) by the hardener. Due to these restrictions, the amount of hardener added is insufficient and the gelatine filters obtained are only incompletely hardened.

The gelatine is poured onto a glass plate which has been covered with a separating layer, and a form is pressed over it to vary the thickness of the filter layer and produce the required density variation in the filter. When the gelatine has cooled this form can be removed.

In the production of wedge or stepped filters, the mechanical stability of the filters is improved by pouring a layer of transparent gelatine over the first layer of gelatine before the first layer has hardened so that a plane parallel, partially hardened filter is obtained after removal from the glass plate.

The partially hardened gelatine filters produced in this way are insufficiently resistant to atmospheric conditions because they are still to some extent hydrophilic. It has been found that when such filters are exposed to changing atmospheric conditions or to tropical conditions, changes occur within a short time in the filter, namely shrinkage by up to 20%, warping and localised thickening, which severely interfere with the required density variation.

Since the dimensions of the filters make it impossible to protect them against atmospheric conditions e.g. by means of glass plates, units equipped with such filters are frequently subject to failure in automatic cameras and cannot be used in tropical climates.

It is an object of this invention to find optical filters comprising a coloured gelatine layer which is easy to produce and dimensionally stable even under extreme conditions of moisture and temperature.

An optical wedge filter comprising a coloured gelatine layer on a support layer has now been found which consists of a flexible transparent support layer, a coloured gelatine layer with stepwise or continuously increasing thickness and a corresponding variation in density and a flexible, transparent covering foil, bonded firmly to the coloured gelatine layer.

A preferred embodiment of the optical filter according to the invention is illustrated in the accompaning diagram. The reference numeral 1 denotes a flexible, transparent support layer, 2 denotes the coloured, wedge-shaped gelatine layer and 3 the flexible transparent covering foil.

The support layer may be made of a foil of a cellulose ester such as cellulose acetate or cellulose acetobutyrate, a polycarbonate, preferably one based on diphenylolpropane, a polyester, particularly one based on polyethylene glycol terephthalate, or a dimensionally stable support made of some other transparent and flexible polymer. The support layer preferably has a thickness of between 100 and 200 $\mu$m.

The filter layer consists of hardened gelatine containing a dye or dye mixture dissolved or finely dispersed in it. Suitable dyes are, e.g. finely divided silver, finely divided carbon black or the organic dyes or dye mixtures described, for example, in U.S. Pat. Nos. 2,622,026 and 2,954,349.

The gelatine layer preferably has a thickness which varies continuously or stepwise within the range of 5 to 400 $\mu$m.

The covering foil consists of a transparent and flexible foil of cellulose or a cellulose derivative such as an ester, particularly cellulose acetate, a polyester or polyolefine, such as polypropylene or polyethylene. The covering foil preferably has a thickness of between 60 and 100$\mu$m.

The optical filters according to the invention are produced as follows:

The coloured gelatine layer is applied in the usual manner to the support layer made of any of the above mentioned materials which is preferably covered with an adhesive coating to bond the hydrophilic layer of the coloured gelatine to the support layer which is generally more hydrophobic. The casting solution for this filter layer preferably already contains a small quantity of hardener such as for example, mucochloric acid or an inorganic hardener such as chrome alum, in order to achieve a slight preliminary hardening of the filter layer. A wedge form is pressed on the still moist gelatine layer so that the thickness of the layer varies continuously or stepwise. The coloured filter layer is then exposed to a formaldehyde atmosphere, preferably a saturated formaldehyde atmosphere. This intensive hardening is preferably carried out at room temperature and reduced pressure, preferably a pressure of between 10 and 50 mm Hg, more particularly at about 20 mm Hg. The length of hardening time may vary within wide limits according to the desired degree of hardening, the temperature and the partial pressure of formaldehyde. A period of time of between 10 hours and several days is generally sufficient. When hardening is carried out at room temperature with a formaldehyde partial pressure of about 20 mm Hg, the time required for achieving a sufficient degree of hardness is about 2 days. This hardening results in very hardened, relatively hydrophobic gelatine layers with excellent mechanical stability. The hardening process according to the invention in which the coloured gelatine layer undergoes a slight preliminary hardening when cast and is then finally hardened in a formaldehyde atmosphere has the special advantage that the dye in the filter layer, which is often sensitive to hardeners, is not affected or only to a negligible extent.

The covering foil is applied to this cast and hardened gelatine layer, preferably by mounting self-adhesive foils on the layer. This method of mounting the foils prevents distortion due to the unequal coefficients of thermal expansion of the support foil and the gelatine, since the gelatine layer is situated between the parts.

Filters produced by this process undergo no dimensional changes in varying atmospheric conditions or in tropical conditions and may therefore be used in the tropics. The capacity of these filters to swell is 50% lower, when tested by the short-term test (storage in water at 20°C for 10 minutes), than that of filters produced by conventional processes. Distortions under conditions of extreme moisture or temperature, such as shrinkage or warping, do not occur.

EXAMPLE 1

An adhesive coating as described in Example 7 of French Patent Application No. 1,455,785 is applied in two applications to a support layer of polyethylene glycol terephthalate which has a thickness of 150 μm.

Composition of the solution for the first application:
8 g of a polyester of isophthalic acid and ethylene glycol prepared according to example 8 of French Patent Specification No. 1,455,785
92 g of 1,2-dichloroethane Composition of solution for second application:
10 g of gelatine
50 g of water
1 g of maleic acid
615 ml of methanol
145 ml of butanol
140 ml of acetone
4 g of cellulose nitrate (K-value 30)
50 ml of methyl glycol.

A gelatine filter layer (coloured neutral grey) is applied from a casting solution with a viscosity of mainly 14 cp (40°C) to the support layer which has been covered with the substrate described above. The composition of the casting solution is as follows:

10% by weight of gelatine, Mp 35°C
2 % by weight of aqueous 5% chrome alum solution
0.1% by weight of raschit
3.0% by weight of a black dye or black dye mixture, e.g. as described in the above mentioned patent specifications,
84.9% by weight of water.

The proportion of dye used depends on the required density of the filter. If the proportion of dye is altered, the proportion of water is changed accordingly.

A circular wedge form is pressed on the gelatine layer, while the layer is still liquid, to impart the appropriate density variation to the filter. When the gelatine has solidified, the form is removed and the gelatine is dried in circulating air at room temperature.

EXAMPLE 2

An adhesive coating of the following composition:
12 g of gelatine
25 ml of water
4 g of phthalic acid
0.9 g of glyoxal
11 g of a cellulose acetate with 56.0% acetic acid and K-value 70
177 ml of methanol
770 ml of acetone is applied to a 200 μ cellulose triacetate foil.

The application of the gelatine filter layer is carried out as described in example 1.

The filter prepared in this way is then hardened in a vacuum cupboard at room temperature, at a partial formaldehyde pressure of 20 mm Hg for 48 hours.

After this storage, the gelatine of the circular wedge filters has a thickness of 5.0 μm at the thinnest point and a thickness of 250 μm at the thickest point. This range of thicknesses corresponds to a range of filter densities of from 0.10 to 3.00. An adhesive foil of cellulose acetate is then mounted on the filter layer to cover the filter completely.

To test the dimensional stability, the filter is stored for 1000 hours under changing climatic conditions according to DIN 50016. In addition, it is tested for endurance under tropical conditions by storing it for a further 100 hours at 40°C and 93% relative humidity. No changes in dimension or density could be observed after storage.

For comparison, a similar circular wedge filter is produced by the conventional process of applying the same filter layer to a glass plate, forming the filter and applying a pure gelatine solution to produce a plane parallel filter. When such a filter is stored under the conditions described above, warping and density changes are so severe that the filter is no longer usable.

We claim:

1. A process for the production of optical wedge filters having a colored gelatin layer on a flexible support by casting a gelatin solution containing a dye on a flexible layer support and after subsequent hardening the gelatin layer and finally covering the gelatin layer with a flexible transparent coating bonded to the layer hardening wherein the improvement comprises cast gelatin solution having a dye for coloring the gelatin and having about 2% of hardener selected from the group consisting of mucochloric acid and chrome alum, partially hardening the layer containing this slight amount of hardener immediately after casting and then pressing the assembled layer support and cast gelatin layer in a wedge form to form the gelatin layer in a progressive varying thickness with the thinnest section one-fiftieth of the thickest section, the thickest section not being greater than 400 μm and completing the hardening of the formed filter layer in a formaldehyde atmosphere with a partial formaldehyde pressure of 5–250 mm Hg, to provide a filter layer capable of supporting an attachable covering foil independent of and unattached to the support.

2. Processes according to claim 1, characterised in that hardening with formaldehyde is carried out at room temperature in the gaseous phase.

* * * * *